June 23, 1942.  R. S. BRESCKA ET AL  2,287,664
ARTICLE TESTING APPARATUS
Filed March 8, 1939  2 Sheets-Sheet 1

INVENTORS
R.S. BRESCKA
E.J. MEAGHER
E.C. REARICK
BY E.R. Nowlan
ATTORNEY

June 23, 1942. R. S. BRESCKA ET AL 2,287,664
ARTICLE TESTING APPARATUS
Filed March 8, 1939 2 Sheets-Sheet 2

INVENTORS
R. S. BRESCKA
E. J. MEAGHER
E. C. REARICK
BY E. R. Nowlan
ATTORNEY

Patented June 23, 1942

2,287,664

UNITED STATES PATENT OFFICE 2,287,664

ARTICLE TESTING APPARATUS

Rudolph S. Brescka, Cranford, Edward J. Meagher, Westfield, and Edward C. Rearick, Cranford, N. J., assignors to Western Electric Company, Incorporated, New York, N. Y., a corporation of New York Application March 8, 1939, Serial No. 260,492

6 Claims. (Cl. 175—183)

This invention relates to an article testing apparatus, and more particularly to an apparatus for gaging crystals used in quartz crystal filters.

Broad-band carrier telephone systems are conditioned to operate in groups of a plurality of channels by the aid of quartz crystal filters. Such filters, when used, are disposed one between each modulator and the line in the transmitting group, to pass only the lower sideband resulting from the modulation, and another, exactly similar to the first, between the line and each demodulator of the receiving group which serves to select from the frequency bands on the line the particular one to be passed to the demodulator, and each comprises a network of quartz crystal plates coated upon both sides with a conductive material to form the contact surfaces. On each side of the quartz crystal plate this coating is divided into parts so that each coating becomes electrically two plates vibrating in unison. One coating thus provides the crystal with two-series arms of each section and the other two-lattice arms.

In the construction of the quartz crystal plates it is important that they be capable of withstanding the stress to which they will be subjected in service, that the coating of the conductive material be satisfactory, that the dividing lines of the coating of each plate be truly central and parallel, dividing the coating in equal parts, and that the electrical characteristics thereof be within predetermined limits.

An object of the invention is to provide a simple, efficient and practical apparatus for testing articles, particularly crystals used in quartz crystal filters.

With this and other objects in view, one embodiment of the invention comprises a pair of aligned contact members, one stationary and the other movable and each having spaced projections to engage coated portions of a quartz crystal and include them in a test circuit, the movable contact member being manually controlled to engage the crystal and apply a predetermined variable pressure thereto and a pair of micrometers positioned at right angles to each other to locate the crystal relative to the contact members.

Other objects and advantages will be apparent from the following detailed description taken in conjunction with the accompanying drawings, wherein Fig. 1 is a front elevational view of the apparatus;

Figure 5:
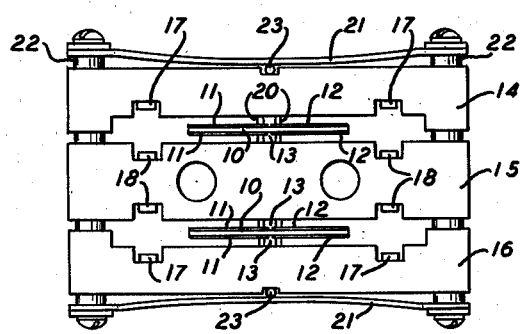
Fig. 5 is a perspective view illustrating the mounting for quartz crystals when in actual use.

Referring now to the drawings, attention is first directed to Fig. 5, which illustrates quartz crystal plates 10 having both faces coated with a suitable conductive material such as aluminum, and the coating upon each face divided into two portions, as indicated at 11 and 12, by a center line 13. The center line 13 represents a space of predetermined width where the coating of conductive material has been removed for the purpose of dividing the coating upon each side of each crystal plate into two conductive portions.

The mounting shown in this figure consists of three members formed of insulating material and bearing reference numerals 14, 15 and 16. The outer insulating members each have one pair of spaced terminals 17 while the central member 15 has two pairs of spaced terminals 18, thus making eight terminals in all, one for each conductive portion of the crystal plates. Adjacent the center line of the mounting are disposed pairs of contact points 20, one pair being carried by the member 14 and positioned coaxially with another pair carried by the opposing surface of the member 15. In a similar manner pairs of contact points are carried by the member 16 and the adjacent portion of the member 15. The contact points of each pair are spaced definite distances apart, are in coaxial alignment with the similar contact points of the other pairs, and the outer ends of each pair are coplanar so that when the crystal plates are supported between their respective pairs of contact points equal pressure will be applied at both positions. The amount of pressure applied is determined by springs 21 supported at their outer ends by bars 22, which serve to hold the mounting in assembly, and apply their total pressure upon rollers 23 disposed at the midpoints of the springs or at the exact center line.

The apparatus shown in Figs. 1 to 4 inclusive was designed to apply the same pressure at the same positions to the crystal plates as will be applied thereto by the springs 21 and further gage the crystal plates and include them in an electrical circuit for a test of their electrical characteristics.

The apparatus comprises a base 30 apertured at 31 (Fig. 4) for receiving an insulating sleeve 32 in which a shank 33 of a stationary contact member 34 is disposed. The sleeve 32 is apertured to receive a cylindrical member 35 formed of hard rubber or the like and positioned to engage a flattened portion of the shank 33 to hold the shank against displacement and in a desired adjusted position when forced in place by a set screw 36. Further adjustment of the stationary contact member 34 may be had through the rotation of a set screw 37 threadedly disposed in the lower portion of the aperture 31 and spaced from the shank 33 by an insulating disk 38. The purpose of the adjustment afforded by the rotation of the set screw 37 is to determine the position of the spaced upper engaging portions 39 of the stationary contact member above the upper surface of a table 40, the latter being apertured for the projection of the engaging portions therethrough. As will be observed by viewing Fig. 4, the upper end of the stationary contact member 34 is reduced by cutting away the sides thereof, leaving the space engaging portions 39 of the same cross surface area as the contact points 20, the center lines of the engaging portions also being equal to the center lines of the contact points 20 and the ends thereof being coplanar. The table 40 serves in general as a support and/or guide for the crystal to be tested, the portion 39 of the stationary contact member, however, extending a slight distance thereabove so that during operation of the apparatus the crystal will be supported entirely by the stationary contact member.

Means is provided to properly position the crystal with respect to the stationary contact member so that if the dimensions of the crystal and the location of the center lines are exact the crystal will be located so that the center line will extend an equal distance between each portion 39. This means consists of calibrated adjusting members, which in the present embodiment are micrometers 45 and 46, mounted in slides or movable members 47 and 48, respectively.

Figure 1:
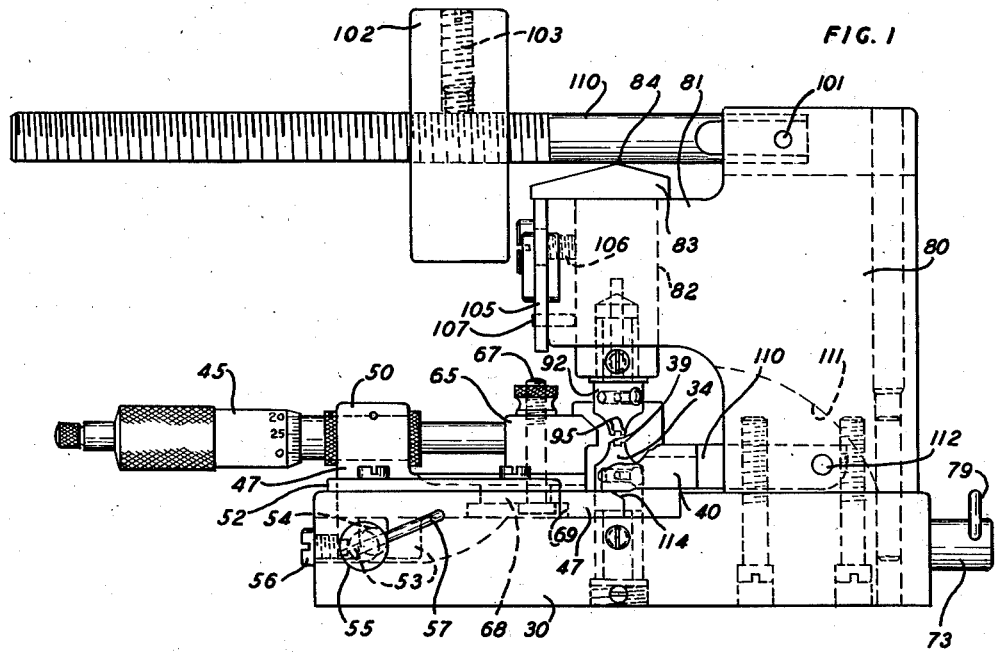
Figure 2:
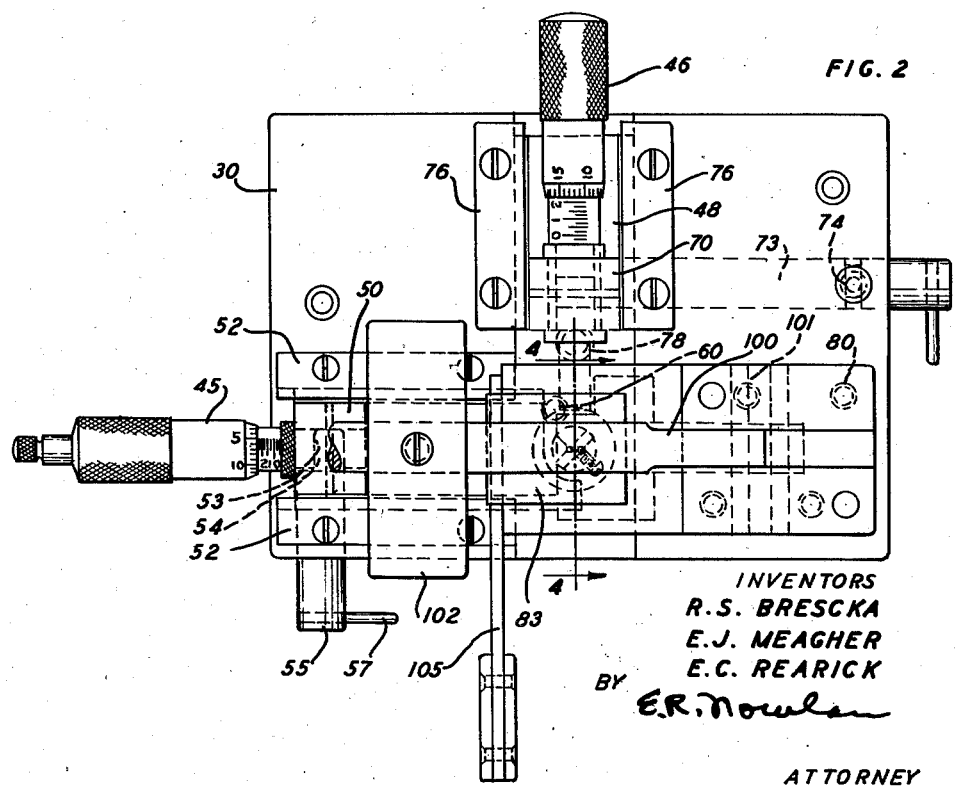
Fig. 2 is a top plan view of the apparatus.

The slide 47 has an upwardly extending apertured projection 50 for receiving and supporting the micrometer 45, as illustrated in Fig. 1. Guideways 52 permit longitudinal movement of the slide 47 in a definite path toward or away from the stationary contact member 34. The under surface of the slide 47 has integral spaced projections 53 positioned to receive therebetween an eccentrically mounted shaft 54 of a rotary actuating member 55. The locking member 55 is positioned in a cylindrical aperture in the base 30 and is held against displacement by the inner end of a screw 56 disposed in an annular groove therein. A handle 57 provides means for manually rotating the actuating member 55 to cause the slide 47 to move toward or away from the table 40. A gage pin 60 is carried by the base 30 and positioned in the path of the slide 47 to limit the inward movement of the slide. Furthermore, the actuating member 55 is so constructed that the eccentric portion or shaft 54 will be on dead center with respect to the projections 53 when the slide engages the gage pin 60, thus locking the slide in a definite position.

The inner ends of the micrometers by themselves are not of sufficient size to accurately locat the crystals relative to the contacts. Therefore, a gage block 65, having a gaging surface 66 of sufficient area to engage one side of a crystal for the major portion of its length, is disposed in association with the micrometer 45. The gage 65 is removably and adjustably secured to the slide by suitable means such as bolt 67, the inner end of which is disposed in an elongate aperture 68 while a head portion 69 rides in an elongate groove upon each side of the elongate aperture.

The slide 48, similar in construction to the slide 47, has a projection 70 for supporting the micrometer 46, and is further provided with projections 71 disposed at spaced positions on the under surface thereof for receiving an eccentrically mounted projection 72 of an actuating member 73. The actuating member 73 is held against displacement by the inner end of a screw 74 riding in an annular groove thereof and is actuated by a handle 75 to cause movement of the slide in its guideways 76 toward and away from the stationary contact member 34. The actuating member 73 is substantially identical in construction and operation to the actuating member 55 so that when the slide 48 is moved into engagement with the gage pin 78 by a handle 79 the eccentric portion 72 will be disposed at dead center to lock the slide in place.

The base 30 has an upright 80 with an apertured projection 81 positioned to support therein a movable head 82, the latter having an enlarged portion 83 positioned to rest upon the upper surface of the projection. The enlarged portion 83 extends beyond the projection 81 and is provided with an angular upper surface forming an edge 84 extending at right angles through the center line of the stationary contact member 34 and the head 82. The head 82 is held against rotation by a pin 87 carried by the projection 81 and extending into an elongate slot 88 of the head.

The lower portion of the head 82 is axially apertured to receive an insulating sleeve 90 in which is disposed a shank 91 of a movable contact member 92. The movable contact member 92 is held against displacement in the sleeve 90 by a cylindrical member 93 of suitable insulating material such as hard rubber extending through an aperture in the sleeve and held in place against a flattened portion of the shank by a set screw 94. The lower portion of the contact member 92 is identical in construction to the upper portion of the stationary contact member 34, it also being provided with spaced engaging portions 95 identical in cross sectional contour and in general alignment with the corresponding portions 39 of the stationary contact member.

Means is provided to apply a predetermined variable pressure to the movable contact member 92. The weight of the head 82 and the members carried thereby is determined and made known and in addition to this weight suitable weight may be added thereto to apply the same pressure to the article being tested, namely the crystal 10, as will be applied thereto during actual service. This additional weight may be applied by the aid of a weight bar 100 pivotally supported at 101 to the upright 80 and threaded for the greater portion of its length to movably receive any suitable weights such as that shown at 102. The weight 102 may be locked against accidental displacement by a set screw 103. A cam lever 105 pivotally mounted at 106 upon the projection 81 is positioned to engage the overhanging portion 83 of the head 82 and when rotated counterclockwise from the position against the stop 107 shown in Fig. 3 causes upward movement of the head and movement of the movable contact member 92 away from the stationary contact member.

Figure 4:
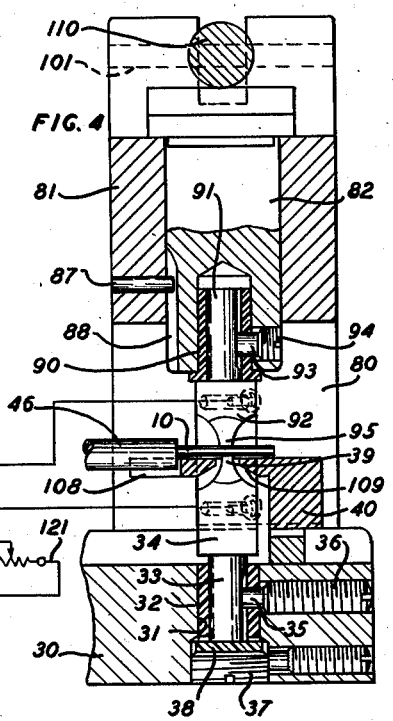
Fig. 4 is a fragmentary vertical sectional view taken substantially along the line 4—4 of Fig. 1.
Figure 3:
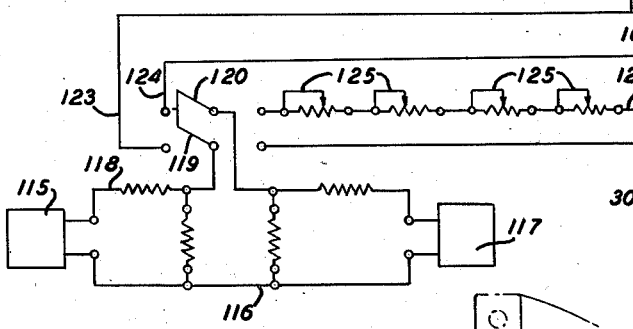
Fig. 3 is a fragmentary side elevational view of the apparatus.
Figure 3:
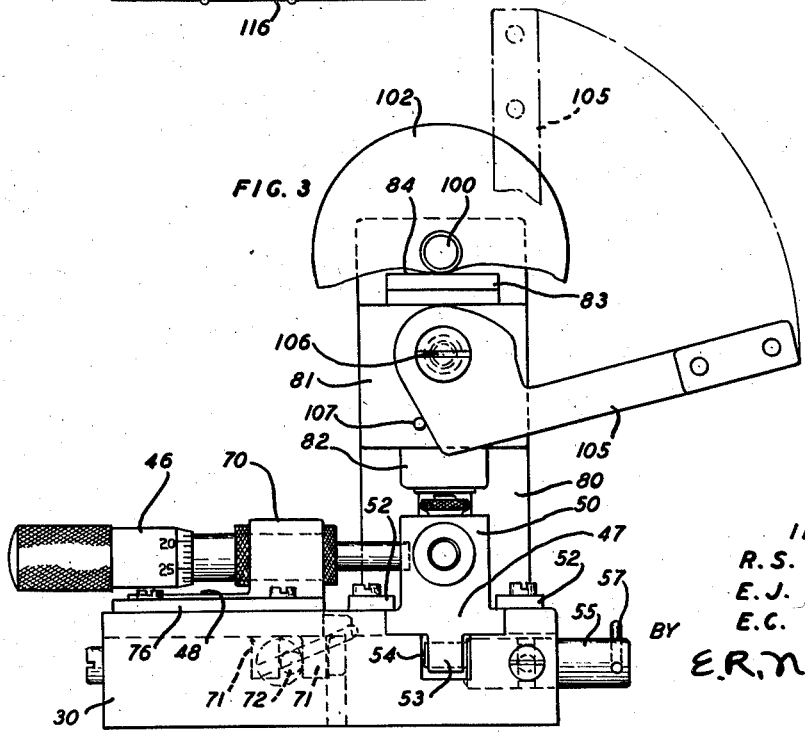

Referring back to the table 40, attention is directed to Figs. 1 and 4. In Fig. 4 it will be noted that the table is somewhat L-shaped in cross section and is notched, at 108, for the article engaging end of the micrometer 46 and cut away, at 109, for the stationary contact member 34. The cut away portion 109 extends through the free end of the table, the purpose being to permit removal of the stationary contact member from its support. An integral projection 110 of the table extends to the right (Fig. 1) and into a groove 111 of the upright 80, where it is pivotally supported at 112. It will be observed, by viewing Fig. 1, that the inner end of the slide 47 has a a tapered surface 114 positioned to ride under the free end of the table 40 to move the table upwardly when the slide is moved into locating position and allow the table to move downwardly when the slide is moved out of locating position.

The apparatus thus far described includes the contact members 34 and 92 to mechanically hold the article or quartz crystal in the same manner and under the same pressure that it is to be held when used in an electrical unit such as a filter employed in the art of telephony. While the article is thus supported, with the engaging portions 39 and 95 of the contact members electrically and mechanically engaging the conductive portions 11 and 12 of the article at the same positions where the contact points 20 of the mounting are to engage such portions, as illustrated in Fig. 5, the article may be included in an electrical test circuit. The electrical test circuit as illustrated in Fig. 5 includes a known frequency source, indicated at 115, connected by one lead line 116 to a suitable detector 117 and by another lead line 118 to the detector through switch arms 119 and 120, when the latter are connected for completion of the circuit either through the contact members 34 and 92 or a resistance test branch circuit 121. The main test circuit includes suitable resistances to condition the electrical energy passing therethrough to be substantially the same as will pass through the crystal when in actual use. There are two characteristics of the crystal that are to be determined, one the frequency and the other the effective resistance. To determine the frequency of the crystal the switch arms 119 and 120 are moved to electrically connect the crystal in the test circuit through a conductor 123, the contact member 92, the crystal, the terminal 34, and a conductor 124. Therefore, the crystal is included in the test circuit and an electrical energy from a known frequency source is supplied thereto, such frequency being varied until the vibration of the crystal is caused and registered on the detector. After this test has been completed it is possible to determine the resistance of the crystal by removing the crystal from the circuit and including the resistance circuit 121 therein through the control of the switch arms 119 and 120. The resistance circuit 121 includes a plurality of variable resistances 125 which may be adjusted to vary the electrical energy in the test circuit until the detector 117 registers the same as it did when the crystal was included in the test circuit. In this manner it is possible to determine the resistance of the crystal by determining the amount of resistance through the aid of the variable resistance 125 in the circuit 121 required to balance the test circuit to obtain the same reading on the detector as registered through the crystal.

Referring now to the operation of the apparatus, it should be understood that the crystals may be of different sizes depending upon the type of filter in which they are to be employed. However, each type of filter requires crystals of definite electrical characteristics, which characteristics depend upon the formation of the crystals, namely the dimensions thereof. It is, therefore, important that the locating members, which in the present embodiment constitute micrometers 45 and 46, be employed for adjustment within fine limits to definitely locate the crystals relative to the contact members 34 and 92. If the crystal is one inch in both dimensions each micrometer will be adjusted to a position of one half inch, which distance is that desired between its abutting surface and the center line of the contact members. When the micrometers are thus adjusted and locked in their locating positions, by the actuating members 55 and 73, and the movable contact member 92 is in its raised position, through the movement of the cam lever 105 to the dotted line position (Fig. 3), a crystal may be disposed in place aided by the table 40 and located so that the edges adjacent the micrometer 46 and the gage block 65 will lie in close engagement with their engaging surfaces. Let it be assumed that the pressure to be applied to the crystal when in use has been determined and the weight 102 has been adjusted to cause application of this same pressure to the crystal. The cam lever 105 may then be rotated clockwise (Fig. 3) to the final position shown in solid lines, allowing the movable contact member 92 to be lowered into engagement with the conductive portions of the crystal. The crystal is thus held in the same position and under the same pressure as in actual use, as shown in Fig. 5.

The locating means, namely the micrometers 45 and 46 and table 40 may then be moved away from the locating positions through the actuation of the members 55 and 73 by rotating these members through the aid of their respective arms 57 and 75. The operator may then include the crystal in the test circuit, by the actuation of the switch arms 119 and 120, to determine from the detector the frequency of the crystal. If the frequency of the crystal is of the value desired the resistance of the crystal may then be determined through the aid of the resistance branch circuit 121. If the electrical characteristic of the crystal is not satisfactory it is first removed from the test circuit, after which the cam lever 105 is actuated to free the crystal and allow its removal from the apparatus. The operator may then use any suitable means (not shown) to vary the characteristics of the crystal such as by grinding away a small portion thereof. After this has been accomplished the crystal may again be inserted in the apparatus after first returning the locating members or micrometers, gage block and table to their locating positions, where they are locked in place by the slides abutting against their respective stops and the actuating members being positioned at or beyond dead center. The movable contact member 92 may again be lowered into engagement with the crystal, applying the desired pressure thereto, the locating members may then be moved away from the crystal, and the crystal again subjected to the test to determine its electrical characteristics.

The mounting of the micrometers 45 and 46, the associated gage block 65 and the table 40 so that they may be moved into and out of locating positions conditions the apparatus for repeated testing operations upon crystals of the same type and permits the freeing of the crystals while included in the electrical testing circuit so that the crystals may vibrate. This is important in that the electrical characteristics of the crystals could not be determined unless they were free to vibrate.

There exists one difference between the manner of supporting the crystals in the mounting and the manner of supporting them in the testing apparatus. In the mounting shown in Fig. 5 each conductive portion is included electrically in its particular circuit while in the apparatus the conductive coatings are electrically connected in the test circuit in parallel. The coatings are so connected in the test circuit to cause greater sensitivity in the circuit to more accurately determine the electrical characteristics of the crystals.

The embodiment of the invention herein disclosed is illustrative only and may be widely modified and departed from in many ways without departing from the spirit and scope of the invention as pointed out in and limited only by the appended claims.

What is claimed is:

1. An apparatus for testing articles comprising means to test the electrical characteristics of an article for use in an electrical unit when mechanically supported in the manner in which it is to be supported in the unit, means to so mechanically support the article including elements movable one relative to the other to grip the article therebetween, a locating member to locate the article relative to the elements, a movable support for the member, means to cause movement of the support to move the member toward and away from a locating position, and means associated with the moving means to lock the support in the locating position.

2. An apparatus for testing articles comprising an electrical testing circuit including means to indicate the electrical characteristics of an article for use in an electrical unit when mechanically supported in the manner in which it is to be supported in the unit, contact members included in the circuit movable one relative to the other to so mechanically support the article, a table disposed adjacent the members to assist in locating the article therebetween but positioned free of the article when the article is supported by the contact members, and means to cause the contact members to apply a predetermined pressure to the article.

3. An apparatus for testing articles comprising elements movable one relative to another to grip an article therebetween, means to cause relative movement of the elements to receive the article therebetween and to grip the article, a stop member positioned to locate the article between the elements, and means to move the stop member away from the article when the article is gripped by the elements.

4. An apparatus for testing articles comprising elements movable one relative to the other to grip articles singly therebetween, means to test the articles when gripped by the elements, a locating member adjustable to various positions for various types of articles, a movable support therefor, a stop for the support, and means to move the support to position the locating member away from the gripped article while the latter is under test and return the member to the same locating position to locate another article.

5. An apparatus for testing articles comprising companion contact members formed to singly support articles, to serve as parts of electrical units, in the manner in which the articles are to be supported in the electrical units, means to cause relative movement of the contact members for the successive positioning and gripping of the articles therebetween, an element to locate the articles between the contacts, an electrical circuit including the contact members and means to test the electrical characteristics of the successive articles, and means to move the element into and out of locating position to respectively cause the elements to locate an article between the contact members and free the article of contact therewith during the testing of the article.

6. An apparatus for testing articles comprising companion contact members formed to singly support articles, to serve as parts of electrical units, in the manner in which the articles are to be supported in the electrical units, means to cause relative movement of the contact members for the successive positioning and gripping of the articles therebetween, locating elements positioned to respectively engage sides and ends of the articles to singly locate the articles between the contact members, an electrical circuit including the contact members and means to test the electrical characteristics of the successive articles, and means to move the locating elements into and out of locating positions.

RUDOLPH S. BRESCKA.
EDWARD J. MEAGHER.
EDWARD C. REARICK.